United States Patent [19]

Sarbach et al.

[11] 3,716,642
[45] Feb. 13, 1973

[54] ANTI-INFLAMMATORY, ANTALGIC AND ANTI-PYRETIC MEDICAMENT, ON A PYRIDOXINE FLUFENAMATE BASIS

[75] Inventors: Raymond Francois Jacques Sarbach; Demetre Yavordios, both of Chatillon-sur-Chaloronne; Le Hao Dong, Montpellier; Jacques Mizoule, Chatillon-sur-Chaloronne; Charles Ricci, Lyon, all of France

[73] Assignee: Institut De Recherche Scientifigue (I.R.S.), Chatillon-sur-Chalorrone, France

[22] Filed: Dec. 7, 1971

[21] Appl. No.: 205,758

Related U.S. Application Data

[63] Continuation of Ser. No. 58,147, July 24, 1970, Pat. No. 3,627,774.

[30] Foreign Application Priority Data

July 24, 1969 France..................................6925288

[52] U.S. Cl...................................................424/263
[51] Int. Cl................................................A61u 27/00
[58] Field of Search.......................................424/263

[56] References Cited

UNITED STATES PATENTS 3,206,463 9/1965 Baetz............................260/295 VB
3,418,416 12/1968 Fourneau......................260/295 VB Primary Examiner—Stanley J. Friedman
Attorney—Alvin Browdy et al.

[57] ABSTRACT

An anti-inflammatory, antalgic and anti-pyretic medicament contains pyridoxine flufenamte and an excipient to which may be added several compatible constituents such as vitamin $B_1$.

9 Claims, No Drawings

ANTI-INFLAMMATORY, ANTALGIC AND ANTI-PYRETIC MEDICAMENT, ON A PYRIDOXINE FLUFENAMATE BASIS

This application is a continuation of parent application Ser. No. 58,147 filed July 24, 1970, now U.S. Pat. No. 3,627,774.

The object of this invention is the introducing of pyridoxine flufenamate in human and veterinary therapy, said new body being endowed with anti-inflammatory, antalgic and anti-pyretic properties. Pyridoxine flufenamate has also some of the biologic and pharmacodynamic properties of vitamin $B_6$.

Pyridoxine flufenamate is basically dealt with hereinafter, however said body may be replaced by similar by-products from other $B_6$ vitaminic factors, such as: pyridoxamine, pyridoxal, it being understood that said bodies have the same therapeutic properties as those indicated above.

Pyridoxine flufenamate is prepared according to standard medicinal weight and is presented, neat or in compatible mixture, under an approved pharmaceutical form, for instance in the form of tablets or capsules, or also in the form of suspension, suppositories, pomade, etc.

The formula of said body is indicated hereunder:

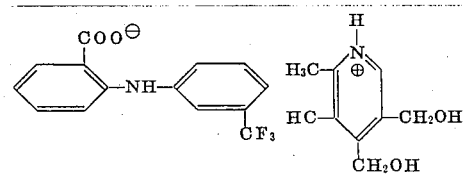

Rough formula: $C_{14}H_{10}F_3NO_2, C_8H_{11}NO_3$
i.e.: $C_{22}H_{21}F_3N_2O_5$
Molecular weight: 450.41
Base pyridoxine: 37.56 percent
Flufenamic acid: 62.44 percent The formulas of the corresponding salts of pyridoxamine or of pyridoxal are obtained by replacing in the above formula:

pyridoxine 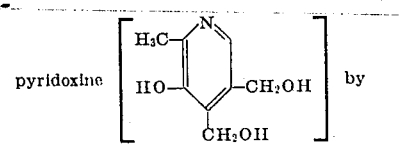 by pyridoxamine 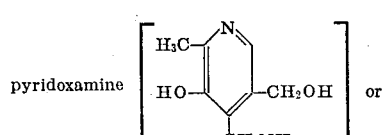 or pyridoxal 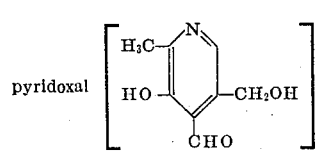

I — PREPARATION PROCESS

First preparation process.

In a 250 ml. stoppered erlenmeyer, is poured 7.025 g. (0.025 mole) of flufenamic acid with 50 ml. of methanol. Then base pyridoxine is added (4.229 g. = 0.025 mole). The mixture is stirred mechanically for 5 minutes. The methanol is evaporated by means of a vacuum revolving evaporator and of a water-bath at 40°C.

As soon as a white cream foam is formed, the vacuum is cut off.

The mixture is then vacuum dried for 2 hours at 30°-35°C.

The product is crushed and vacuum dried again for 1 night without heating and secured from moisture.

Second preparation process.

The reaction is indicated hereunder:

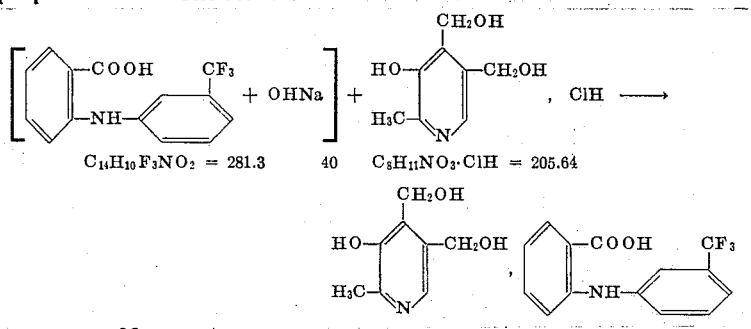

Preparation process:

A warm solution containing 2.81 g (0.01 mole) of flufenamic acid is added while being stirred in 20 ml. of water containing 0.40 g. (0.01 mole) of soda to a solution containing 2.06 g. (0.01 mole) of pyridoxine hydrochlorate in 15 ml. of water. The product crystallizes immediately and is placed into a refrigerator during 1 hour or 2. The product is then dried, washed with water and vacuum dried.

Thereby, 3.42 g. of pale greenish yellow crystals is obtained (yield: 76 percent); upon the recrystallization in ethanol at 95 percent and in water in presence of carbon, crystals remain colored.

II — PROPERTIES

Appearance: pale yellow crystalline powder
Melting point: between 126 and 127°C.
Moisture (Karl Fisher): under 0.5 percent
Hygrometric strength after 3 hours: between 0.9 and 1 percent
Solubility: highly soluble in methanol, ethanol at 96 percent, acetone; not soluble in water, benzene, ether, coloroform.

Ultra-violet spectrum: pyridoxine flufenamate shows in a methanolic solution and after dilution in distilled water, the following characteristics:
maximum absorption: $\lambda = 323$ m$\mu$ - 289 m$\mu$
minimum absorption: $\lambda = 253$ m$\mu$.

III — TOXICOLOGIC AND PHARMACOLOGICAL SURVEY

This survey includes:
1° — Determination of toxicity
2° — Determination of anti-inflammatory power
3° — Determination of antalgic power
4° — Determination of antipyretic power

A. TOXICITY

This survey is conducted with 40 male Charles River mice weighing between 19 and 21 g., and shared out into four batches of 10 mice.

Each batch is given orally, and with volume of 0.5 ml./20 g. one of the following doses of pyridoxine flufenamate = 800, 1,200, 1,800, 2,700 mg/kg in suspension into carboxymethyl cellulose at 0.5 percent.

Mice are kept under watch during 5 days after which toxicity is noted.

Results are indicated hereunder:

| Pyridoxine flufenamate | 800 mg/kg | 1200 mg/kg | 1800 mg/kg | 2700 mg/kg |
|---|---|---|---|---|
| Death rate | 10% | 40% | 70% | 80% |

A DL 50 equal to 1,500 mg/kg appear from these results.

B. — ANTI-INFLAMMATORY POWER

Anti-inflammatory research is conducted on a rat leg oedema caused by intraplantar injection containing 0.50 ml. of carragenin solution at 1 percent.

Forty 115 – 125 g male Charles River rats are thus divided into one test batch of 10 animals and three processed batches of 10 animals each. The treatment is given orally by means of a suspension 1 hour before the carragenin injection.

Pyridoxine flufenamate doses used are as follows:

4.8, 14.4 and 43.2 mg/kg.

Results

Three hours after the carragenin injection, results obtained are as indicated hereunder:

| Pyridoxine flufenamate dose | 0 | 4.8 mg/kg. | 14.4 mg/kg. | 43.2 mg/kg. |
|---|---|---|---|---|
| Swelling | 1.16 ml. | 0.75 ml. | 0.70 ml. | 0.59 ml. |
| Inhibition rate of oedema | | 35 % | 40 % | 49 % |

Under these conditions, the DE rate is 45 mg/kg.

C. — ANTALGIC POWER ON MICE

The test used is that of SIEGMUND.

An intraperitoneum injection of phenylbenzoquinone made on a mouse causes a painful syndrome which materializes by abdomen contortions.

Twelve male 19 – 21 g. Charles River mice are used by dose.

Pyridoxine flufenamate doses used are: 0 (test) — 80 — 160 and 320 mg/kg.

The treatment is made orally.

Results

| Pyridoxine flufenamate dose | 80 mg/kg | 160 mg/kg | 320 mg/kg |
|---|---|---|---|
| Antalgic power | 42% | 44% | 53% |

Under these conditions, the DE 50 rate is 300 mg/kg.

D. — ANTIPYRETIC POWER

Over-temperature is caused to rats by subcutaneous injection of 10 ml/kg of barm in suspension at 20 percent.

Three batches of 10 male 180 – 200 g. Charles River rats are made.
  Batch 1 = Test batch
  Batch 2 = Pyridoxine flufenamate at 80 mg/kg
  Batch 3 = Pyridoxine flufenamate at 320 mg/kg The treatment is carried out 4 hours after the injection of barm. Temperatures are read just before the beginning of the treatment and then every hour during 4 hours.

Results

Average temperature variations as from the beginning of the treatment

| Number of hours after treatment | Tests | Pyridoxine flufenamate 80 mg/kg | Pyridoxine flufenamate 160 mg/kg |
|---|---|---|---|
| 1 | + 0°7C | 0 | 0 |
| 2 | + 0°8C | −0°1C | −0°2C |
| 3 | + 1°1C | 0 | −0°3C |
| 4 | + 1°2C | 0 | −0°1C |
| Accrued variations | + 3°8C | −0°1C | −0°6C |

Immediately after the 80 mg/kg dose, the pyridoxine flufenamate hinders the progress of over-temperature resulting from the injection of barm.

Findings

Pyridoxine flufenamate has outstanding anti-inflammatory anti-pyretic and antalgic properties.

Its therapeutic index DL 50/DE 50 is high, particularly as concerns anti-inflammatory power and also antipyretic power.

IV — HUMAN AND ANIMAL THERAPEUTIC USE EXAMPLE

On the basis of the pharmacodynamic and toxicologic collected and set forth hereinabove, pyridoxine flufenamate possesses definite anti-inflammatory, antalgic and antipyretic properties.

Rheumatology is an excellent field for the use of the medicament.

Pyridoxine flufenamate is also especially recommended for treatment of neuritis, polyneuritis, cholecystis, etc., cases to which the various above mentioned properties as well as specific properties of $B_6$ vitamin are applicable all together.

In the case of neuritic diseases with an adult, 1.50 to 2 g. of pyridoxine flufenamate may be given at the rate of three or four doses per day at regular intervals during the nycthemer.

The active constituent for these uses can appear under various pharmaceutical forms: tablets, capsules, suppositories ... titrated at 250, 375, 500 mg.

Pyridoxine flufenamate may be given to children. In the case of rheumatic algy, for instance, 10 mg. per kilo of weight and per day will be prescribed, preferably under the form of syrup, of powder or granules titrated at 1 or 2 percent of active constituent.

According to specific directions, pyridoxine flufenamate may be associated with one or several other compatible active constituents, such as $B_1$ vitamin, for instance.

The medicament may also be used for anti-inflammatory, antalgic and anti-pyretic treatments with animals, particularly dogs, cats, horses, cattle and sheep.

Medicaments according to the invention include the following:

Tablets
  Pyridoxine flufenamate 375 mg.
  Excipient: q.s.p. one tablet
Capsules Pyridoxine flufenamate 250 mg.
Excipient: q.s.p. one capsule Syrups
Pyridoxine flufenamate 1 g.
Excipient: q.s.p. 100 g. of syrup Granules
Pyridoxine flufenamate 2 g.
Excipient: q.s.p. 100 g. of granules Suppositories
Pyridoxine flufenamate: 500 mg.
Excipient: q.s.p. one suppository Coated tablet
Pyridoxine flufenamate 0.160 g.
Excipient: q.s.p. a tablet Excipients which may be used include sugar, corn starch, PVP, magnesium stearate, gum lac, alcohol 95°, ventilated talc, gum arabic, titanium dioxide, sun yellow coloring and tartrazine.

Following are some specific examples of the invention:

TABLETS

| | |
|---|---|
| Pyridoxine flufenamate | 0.160 g. |
| Sugar | 0.125 g. |
| Corn starch | 0.050 g. |
| Polyvinylpyrrolidone | 0.005 g. |
| Modified starch | 0.050 g. |
| Magnesium stearate | 0.010 g. |
| (for a tablet of about 0.400 g.) | |

CAPSULES

| | |
|---|---|
| Pyridoxine flufenamate | 0.160 g. |
| Icing sugar | 0.150 g. |
| Modified starch | 0.050 g. |
| Magnesium stearate | 0.002 g. |
| Silicone talc at 0.5% | 0.002 g. |
| (for a gelule No. 0) | |

SYRUP

| | |
|---|---|
| Pyridoxine flufenamate | 1 g. |
| Lump sugar | 30 g. |
| P-carraghenate | 0.9 g. |
| Soda nipagine | 0.150 g. |
| Soda nipasol | 0.020 g. |
| Pure quince fruit flavor | 4 g. |
| Scarlet coloring | 0.012 g. |
| Permuted water q.s.p. | 100 ml. |

GRANULES

| | |
|---|---|
| Pyridoxine flufenamate | 2 g. |
| Icing sugar | 66 g. |
| Corn starch | 30 g. |
| Polyvinylpyrrolidone | 2 g. |
| q.s.p. 100 g of granules | |

SUPPOSITORIES

| | |
|---|---|
| Pyridoxine flufenamate | 0.500 g. |
| Semi-synthetic glycerides | 2.500 g. |
| (for a suppository of about 3 g.) | |

COATED TABLETS

| | |
|---|---|
| Pyridoxine flufenamate | 0.160 g. |
| Sugar | 0.125 g. |
| Corn starch | 0.050 g. |
| Polyvinylpyrrolidone | 0.005 g. |
| Magnesium stearate | 0.010 g. |
| Shellac | 0.0072 g. |
| Ethyl-alcohol at 95° | 0.0164 g. |
| Gum-arabic | 0.0014 g. |
| Titanium oxyde | 0.0024 g. |
| Sun yellow coloring | 0.00012 g. |
| Tartrazine | 0.00006 g. |
| Modified starch | 0.050 g. |
| Sugar q.s.p. a coated tablet of | 0.550 g. |

A specific example of a composition with vitamin B1 added is as follows:

| | |
|---|---|
| Pyridoxine flufenamate | 0.160 g. |
| Vitamin B 1 | 0.050 g. |
| Sugar | 0.125 g. |
| Corn starch | 0.050 g. |
| Polyvinylpyrrolidone | 0.005 g. |
| Modified starch | 0.050 g. |
| Magnesium stearate | 0.010 g. |
| (for a tablet of about 0.450 g.) | |

Thirty patients having acute or chronic rheumatisms have been treated with four to six tablets a day, the treatment duration varied from 8 days to 3 months.

The analysis of the so treated cases have shown a beneficial action extending from the total vanishing of the clinical manifestations up to the diminishing of the dolorous, stiffening or lameness phenomena.

This action was revealed in cases of:
inflammatory rheumatisms (anchylosing spondylarthritis, rheumatoid polyarthritis, psoriasic rheumatism).
arthrosis (gonarthrosis, Bouchard rheumatism, dosarthrosis)
radiculalgies (sciatic, arvicobrachial)
humeral scapulo periarthritis
lombalgies A particularly good tolerance of this medicament was found in 90 percent of the cases.

Examples of Clinical Cases

Case No. 1:
Name: PEN . . . Jean
Republican guard — 37 years
Admitted to an hospital for left sciatic radiculalgy.
Four tablets a day for 25 days. Excellent results.
Treatment stopped after recovery.
Excellent clinical and biological tolerance.

Case No. 2:
Name: PRE . . . Sabin
Office Clerk — 47 years
Admitted to an hospital for dolorous outbreak of dorsal arthrosis
Four tablets a day for 20 days.
Excellent results.
Full vanishing of the pains. Good tolerance.

Case No. 3:
Name: POI . . . Pierre
Colonel — 56½ years
Admitted to an hospital for psoriasic rheumatism.
Six tablets a day for 25 days.
Excellent results, vanishing of the pains.
Excellent tolerance.

Case No. 4
Name: GUI . . . Henri
Student — 22 years
Admitted to an hospital for anchylosing spondilarthritis
Six tablets a day for 13 days
Good results
Vanishing of the nocturnal lumbar spondaneous pains and of the two wrist pains.

What is claimed is:

1. A medicament comprising as active ingredient a compound of the formula

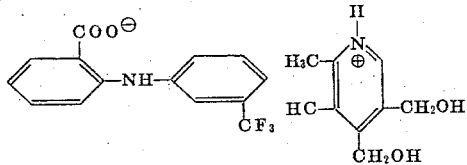

wherein X represents a member selected from the group consisting of —CH$_2$OH, —CH$_2$—NH$_2$ and —CH=O, and an excipient said active ingredient being present in an effective amount to provide anti-inflammatory, antalgic or anti-pyretic action.

2. A medicament in accordance with claim 1 wherein said medicament is in the form of a tablet.

3. A medicament in accordance with claim 1 wherein said active ingredient is present in an amount of about 0.160 – 0.375 g.

4. A medicament in accordance with claim 1 wherein said medicament is in the form of a capsule.

5. A medicament in accordance with claim 1 wherein said medicament is in the form of a syrup.

6. A medicament in accordance with claim 1 wherein said medicament is in the form of granules.

7. A medicament in accordance with claim 1 wherein said medicament is in the form of a suppository.

8. A medicament in accordance with claim 1 further including vitamin B1.

9. A medicament in accordance with claim 8 which contains 0.160 g. of said active ingredient and 0.050 g. of vitamin B$_1$.

* * * * *